No. 845,896. PATENTED MAR. 5, 1907.
G. T. RENNERFELT.
SPEED VARYING MECHANISM.
APPLICATION FILED JUNE 8, 1905.

2 SHEETS—SHEET 1.

Witnesses:
Elmer R. Shipley
M. S. Belden

Gustaf Ture Rennerfelt
Inventor
by James W. See
Attorney

No. 845,896. PATENTED MAR. 5, 1907.
G. T. RENNERFELT.
SPEED VARYING MECHANISM.
APPLICATION FILED JUNE 8, 1905.

2 SHEETS—SHEET 2.

Witnesses:
Elmer R. Shipley
M. S. Belden

Gustaf Ture Rennerfelt
Inventor
by James W. See
Attorney

UNITED STATES PATENT OFFICE.

GUSTAF TURE RENNERFELT, OF SCRANTON, PENNSYLVANIA, ASSIGNOR TO WALTER H. FOSTER, OF NEW YORK, N. Y.

SPEED-VARYING MECHANISM.

No. 845,896.  Specification of Letters Patent.  Patented March 5, 1907.

Application filed June 8, 1905. Serial No. 264,241.

*To all whom it may concern:*

Be it known that I, GUSTAF TURE RENNERFELT, a citizen of Sweden, residing in Scranton, Lackawanna county, Pennsylvania, (post-office address No. 502 Harrison avenue, Scranton, Pennsylvania,) have invented certain new and useful Improvements in Speed-Varying Mechanism, of which the following is a specification.

In many machines—such, for instance, as metal-working lathes—a wide range of speeds varying in a constant ratio is highly desirable, and a given speed should maintain itself with substantial constancy regardless of the resistance offered by the work being done. In the driving of such machines by means of an electric motor if the motor have a wide range of speed variations there is necessarily involved a special motor of low-speed type and consequent low efficiency, costly, heavy, and so bulky as to preclude satisfactory installation in self-contained machines.

By means of my invention I am able to employ motors of standard type, small, comparatively low-priced, and with very limited range of speed variations, at the same time securing any desired range of speed variations in the driven machine, the speeds increasing in geometrical progression. I employ an electric motor of any ordinary type, its speed being varied within narrow limits, preferably by varying the strength of the field. I also provide for a very convenient command of all of the speeds involved in the system.

My invention will be readily understood from the following description, taken in connection with the accompanying drawings, in which—

Figure 1:
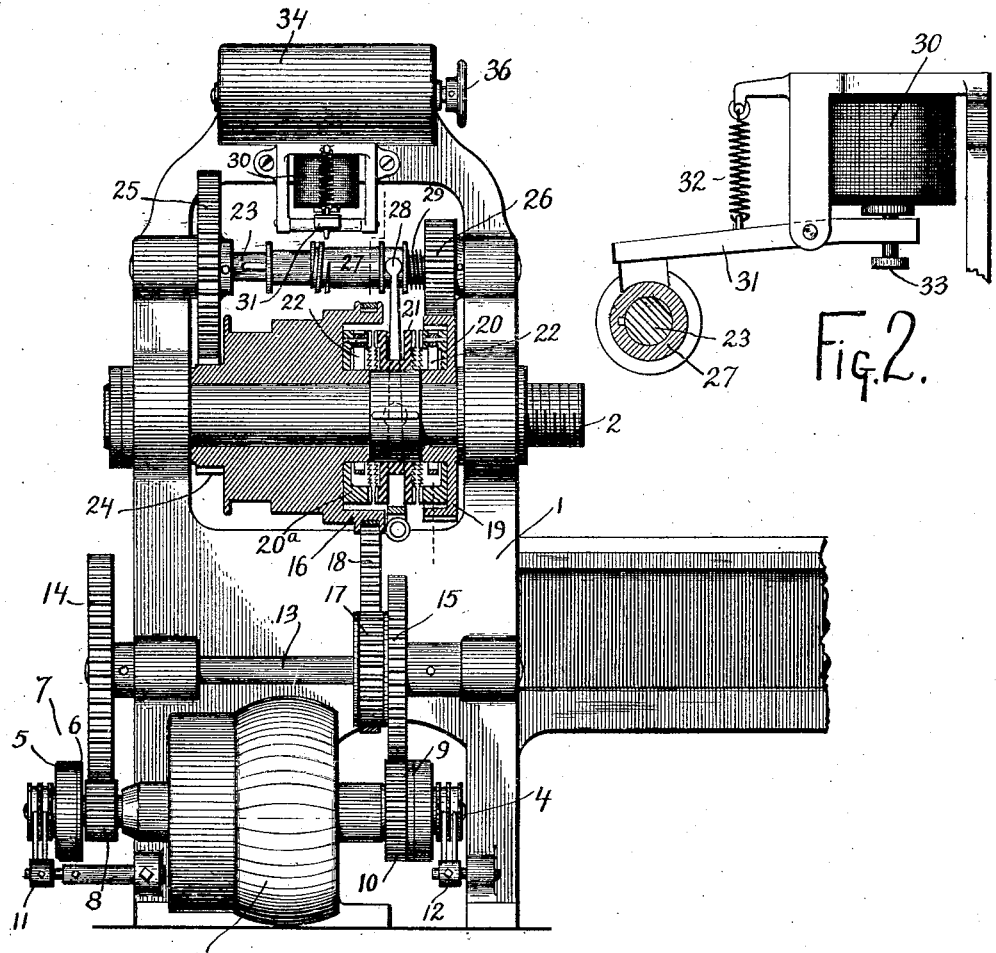
Figure 2:
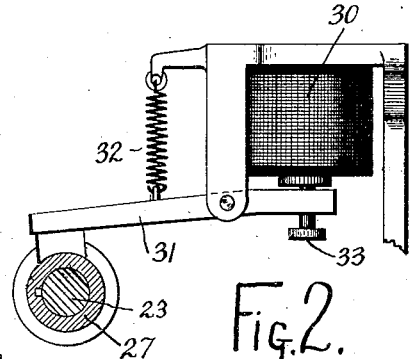
Figure 3:
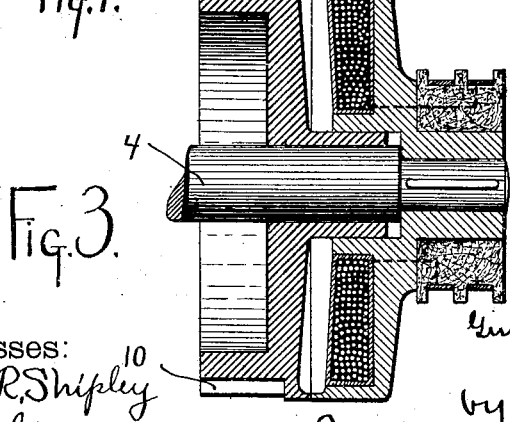
Figure 4:
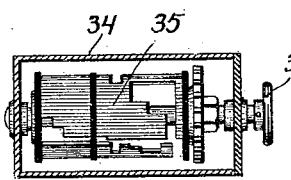
Figure 5:
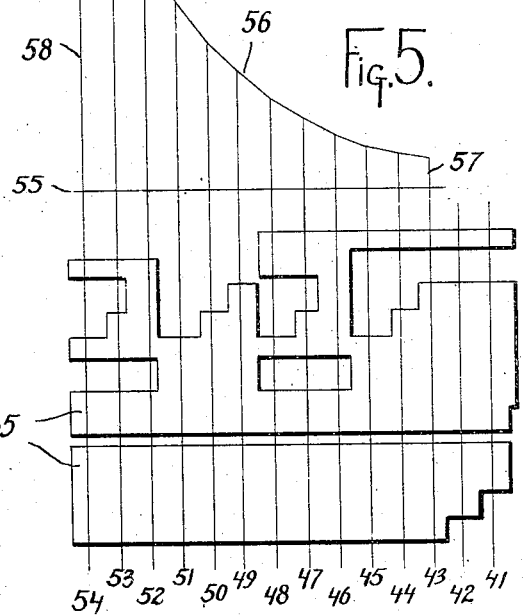
Figure 6:
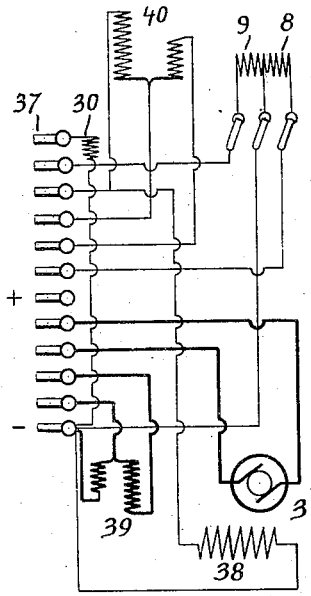
Figure 6:
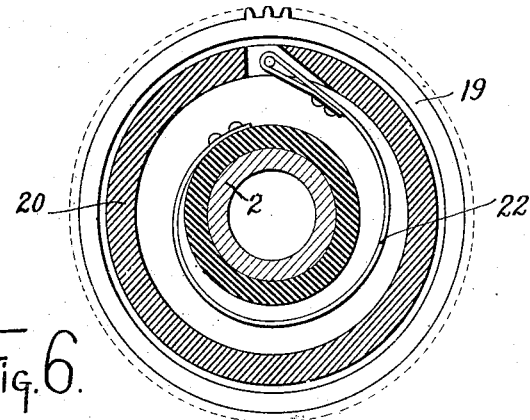

Figure 1 is a front elevation, part vertical section, of a speed-varying mechanism exemplifying my invention as embodied in a lathe; Fig. 2, a side elevation of the magnet, &c., controlling the shifting-clutch; Fig. 3, a vertical diametrical section of one of the motor-clutches; Fig. 4, a front elevation of the controller, its casing being in vertical section; Fig. 5, a diagram indicating the controller-plates, the speeds, and the circuits; and Fig. 6, a vertical section, in a plane at right angles to its axis, of one of the clutching members pertaining to the shifting-clutch.

In the drawings, 1 indicates a frame for the support of the moving parts, the example considering it as the head-stock of a lathe; 2, the spindle of the lathe, representing the part to be driven at selective speeds; 3, an electric motor of any ordinary type; 4, the armature-shaft; 5, one member of a magnetic clutch fixed on the armature-shaft; 6, the other member of this clutch, loose on the armature-shaft; 7, this magnetic clutch considered as a whole, its details of construction being apparent from Fig. 3, this clutch being hereinafter spoken of as the "slow" clutch; 8, a pinion loose on the motor-shaft and fast with the member 6 of the slow clutch, the construction being manifestly such that the energizing of the clutch results in locking the pinion to the armature-shaft; 9, a second magnetic clutch on the armature-shaft, this second clutch being hereinafter spoken of as the "fast" clutch; 10, a pinion loose on the armature-shaft and locked thereto by the fast clutch when the latter is energized; 11, brushes for conveying current to the slow clutch; 12, brushes for conveying current to the fast clutch; 13, a counter-shaft; 14, a gear fast on the counter-shaft and engaging pinion 8; 15, a gear fast on the counter-shaft and engaging pinion 10; 16, a sprocket-wheel loose on the spindle 2, this sprocket-wheel being illustrated as being incorporated with the usual cone-pulley on a lathe-spindle, the example serving to illustrate a method of machine conversion from belt drive to motor drive; 17, a sprocket-wheel fast on the counter-shaft; 18, a chain engaging the two sprocket-wheels; 19, a spur-gear loose on spindle 2; 20, a disk loose on the hub of gear 19 and carrying facial clutch-teeth; 20ª, a clutch-disk like clutch-disk 20, mounted loosely on the hub of sprocket-wheel 16; 21, a shifting-clutch splined upon the spindle 2 between the two clutch-disks and adapted to engage the latter alternatively; 22, a volute spring disposed within each of the clutch-disks, one end of this spring being secured to the clutch-disk and the other to the hub on which the clutch-disk is mounted, the arrangement being such that as the gear turns forward it puts the spring under strain and through it transmits motion to the clutch-disk; 23, a back gear-shaft; 24, a pinion fast with sprocket-wheel 16; 25, a gear fast on the back gear-shaft and engaging pinion 24; 26, a pinion fast on the back gear-shaft and engaging spur-gear 19;

27, a sleeve splined on the back gear-shaft and having a short exterior thread; 28, a lever engaging sleeve 27 and the sliding clutch 21 in such manner that the endwise movement of the sleeve serves in shifting the clutch; 29, a spring upon the back gear-shaft, urging the sleeve in such direction that the sliding clutch 21 will be normally engaged with clutch-disk 20ª; 30, an electromagnet; 31, its armature-lever carrying a tooth adapted when the magnet is energized to engage the thread of sleeve 27; 32, a spring serving when the magnet is inert to pull the armature-lever to position of release and disengage its tooth from the thread of the sleeve; 33, a stop to limit the releasing movement of the armature-lever; 34, an electric controller of rotary type; 35, its contact-plates; 36, the handle for adjusting the controller; 37, contact-fingers to coöperate with the controller-plates, various electrical connections going to these contact-fingers, the mains for the supply of current to be connected with the fingers marked, respectively, with the plus and minus signs; 38, the motor-field; 39, starting resistances for the armature-circuit; 40, resistances in the field-circuit; 41 to 54, inclusive, lines indicating the points of contact of the fingers with the controller-plates as the latter are adjusted to various positions; 55, the diagrammatic line of zero speed of the spindle 2; 56, a curve illustrating the several speeds of the spindle; 57, an indication of the lowest normal speed of the spindle, and 58 an indication of the highest speed of the spindle.

The sliding clutch 21, being a jaw or toothed clutch, may not with advantage be thrown into engagement with a positively-moving clutch-disk. The introduction of springs 22 between the toothed clutch-disks and the parts driving them avoids the objection to a positive connection. The clutch 21 may, if desired, be thrown by hand in the usual manner of such clutches; but it may be preferred to throw the clutch by the action of the machine itself. Assuming sprocket-wheel 16 to be running continuously, the back gear-shaft, and consequently the spur-gear 19, will be turning continuously. Normally sleeve 27 is to the left, held there by spring 29, and the sliding clutch locks the sprocket-wheel 16 to the spindle. If the sleeve be shifted to the right it will obviously effect the unlocking of the sprocket-wheel from the spindle and bring about the locking of spur-gear 19 to the spindle, the spindle then being driven at a much lower rate of speed than the sprocket-wheel. Normally the tooth of the armature-lever 31 is free of the thread of sleeve 27. If magnet 30 be energized, then the tooth of its lever engages the thread of the sleeve and acts as a stationary nut, whereupon the sleeve shifts to the right and throws the sliding clutch to spur-gear 19. When the throwing movement shall have been completed, the end of the thread upon the sleeve is reached and the tooth is at liberty to descend somewhat further and engage behind a shoulder upon the sleeve, and thus lock the sliding clutch into engagement with the spur-wheel independent of the thread upon the sleeve. When the magnet is deënergized, then spring 32 withdraws the tooth of the armature-lever from the sleeve and the spring throws the clutch out of engagement with spur-gear 19 and into engagement with the clutch-disk carried by the sprocket-wheel 16. With the sliding clutch to the left and the spindle consequently running at the speed of sprocket-wheel 16, the condition is that of "back gear out," while with the sliding clutch to the right, locking spur-gear 19 to the spindle, the condition is that of "back gear in." Any convenient switching device might be employed for bringing about the desired action of magnet 30; but the illustration provides for bringing that magnet within the domination of the controller which dominates the other circuit conditions.

As regards the motor-clutches 7 and 9, it needs here only to be said that when the clutches are deënergized their pinions are free on the armature-shaft, but when respectively energized they serve in locking their pinions to the armature-shaft.

The controller, as illustrated in Fig. 4, comprehends two controller-plates arranged in cylindrical form and provided with a handle for turning the cylindrical structure. In Fig. 5 the plates are illustrated diagrammatically and the movement of the plates to the right is progressively from the idle condition of the motor to the condition of highest speed for the spindle.

In Fig. 5 the speed ordinates of the diagram have been prolonged downwardly over the controller-plates to indicate lines of contact for the controller-fingers as the plates are adjusted, and these lines may therefore be spoken of as "speed-lines" for the spindle or as "position-lines" for contact-fingers. In Fig. 5 the controller-plates are free from the fingers and everything is idle. By analyzing Fig. 5 and assuming the controller-plates, which never change their relationship to each other, to be moved to bring the lines 41 to 54, inclusive, successively under the contact-fingers it will be apprehended that when position-line 41 is under the contact-fingers the motor will start with full strength of field and with both sections of the resistance 39 in series with its armatures, the slow clutch is at the same time put into action, due to the energizing of winding 8, and the back gear is thrown in, due to energizing of magnet 30. It will be seen from the diagram that as the controller-plates are further moved to the right the first section, the large one, of the starting resistance is short-circuited at 42 and the second section is short-circuited at 43, so that the speed is gradually increased from line 41 to line 43. It will further be seen from the diagram that the fast clutch 9 will come into action instead of the slow clutch 8 on the line 46. At the line 49 the slow clutch is again in action, the fast clutch is out, and the back gear is out, this latter fact being due to the deënergizing of magnet 30, and it will further be seen that at line 52 the slow clutch is out and the fast clutch is in, the back gear remaining out from 49 to 54. The first two speeds at 41 and 42 with resistance in the armature-circuit will ordinarily not be used as actual working speeds of the machine, so that the speed at 43 is to be considered as the first working speed with the motor at its lowest normal speed and the transmission to the spindle at highest ratio of reduction, thus giving to the spindle its first normal speed or the lowest speed of the system. The next step 44 introduces one of the resistances 40 into the shunt-field and gives to the motor its second speed and to the spindle its second speed. The next step introduces the other of the resistances 40 into the shunt-field and gives to the motor its third speed and to the spindle its third speed, this condition corresponding with line 45 on the diagram. It will be further seen that the next step 46 restores the motor to its first speed, but substitutes the fast clutch for the slow one, that the successive steps bring in first the second, then the third speed of the motor, that the motor is then, at 49, put again to its first speed with the back gear out and the slow clutch in, then the motor goes to its second speed at 50 and then at 51 to its third speed, that then the motor goes again at 52 to the first speed with the slow clutch out and the fast clutch in, that the motor then at 53 goes to its second speed, and then at 54 to its third speed. The three motor speeds have thus been made to result in the twelve spindle speeds. The geometrical progression of the increase in the speeds is due to the proportioning of the motor speeds and of the gear ratios. Let the resistances for varying the motor speeds be such that the spindle speed resulting from the third motor speed bears the same ratio to the second spindle speed that the second spindle speed bears to the first spindle speed. The ratio is to be constant for any two neighboring spindle speeds in the system, and this constant may be represented by $k$. The spindl speed resulting from the substitution of the fast clutch for the slow clutch is to bring about a ratio of increase represented by the constant $k$ and similarly as to other modifying-gear—as, for instance, the ratio of increase effected by the back gear. Having selected maximum and minimum speeds for the spindle and determined upon the number of speeds desired, the desired geometrical relationship can be arrived at without trouble and with accuracy, any slight departures from absolute accuracy as incident to the exigencies of tooth-numbers being generally inconsiderable. It is to be observed that there is a group of motor speeds of comparatively narrow range and that this group is employed repetitively, the slowest speed of the motor producing upon the spindle a higher speed than was last produced by the highest speed of the motor.

The following general rule can be formulated: If the spindle is to run at $n$ number of speeds varying in geometric progression from minimum $s$ to maximum $S$, then the constant $k$, which equals $$\sqrt[n-1]{\frac{S}{s}}$$

represents the ratio between any two contiguous speeds, and the ratios of the gears as well as the variations in the speed of the motor itself are certain powers of said constant. If the number of motor speeds is $m$, then the extent of the speed variation in the motor is equal to $k^{m-1}$, and the ratio of the first gearing is equal to $k^m$, and the ratio of the second gearing is $k^{2m}$, and the ratio of the third gearing is $k^{4m}$, if a third gearing be employed. More than three would seldom be required.

Applying values to the illustrated example, assume them as follows: highest spindle speed $S = 380$; lowest spindle speed, $s = 27$; $n =$ twelve speeds of the spindle, to vary in geometric progression; $m =$ three speeds of the motor, and lowest speed of motor $=$ 1050 r. p. m. The formula gives for this case $$k = \sqrt[n-1]{\frac{S}{s}} = \sqrt[11]{\frac{380}{27}} = 1.27$$

The extent of speed variation in the motor will be $$k^2 = \frac{2}{1.27} = 1.62,$$

so that the highest speed of the motor is $1.62 \times 1050 = 1700$ r. p. m. The second speed of the motor will be $1.27 \times 1050 = 1330$ r. p. m. The ratio of the gearing will be $$k^3 = \frac{3}{1.27} = 2.06,$$

and the ratio of the back gear will be $$k^6 = \frac{6}{1.27} = 4.23,$$

The exact values of the second and third motor speeds are obtained by choosing the proper values for the resistance in the field-winding of the motor. The ratios of the gearings are obtained by making the gears of proper relative size. With toothed gearing the exact ratios will generally not be obtained; but in the example at hand a good approximation will be had by choosing the gears as follows: pinion 8 to have twenty-six teeth, gear 14 to have one hundred and twelve teeth, pinion 10 to have forty-four teeth, gear 15 to have ninety-four teeth, sprocket-wheel 17 to have twenty-six teeth, sprocket-wheel 16 to have forty-six teeth, pinion 24 to have fifty-five teeth, gear 25 to have eighty-nine teeth, pinion 26 to have thirty teeth, gear 19 to have seventy-eight teeth. These gears will give a ratio between the fast and the slow clutch-gearing of $$\frac{112}{26} \cdot \frac{94}{24} = \frac{4.31}{2.14} = 2.01,$$

which is fairly close to the desired figure, 2.06. The number of teeth in the wheels constituting the back gear will settle its ratio to $$\frac{89}{55} \times \frac{78}{30} = 4.21,$$

which is close enough to the desired 4.23. The train 17 and 16 serves only for transmitting the motion and for reducing but not for varying the speed.

From the example and formula given it is manifest that the system is capable of lending itself to a wide range of well-proportioned spindle speeds founded on any plurality of motor speeds. The details of construction are not at all to be viewed as limitations, but merely as exemplifications of the invention.

I claim as my invention—

1. In speed-varying mechanism, the combination of an electric motor, a spindle to be driven at selective rates of speed, an intermediate transmission device, a direct connection between said intermediate transmission device and said spindle, a controller serving to give the motor a plurality of speeds, a first transmitting device connecting said motor and said intermediate transmission device, a second transmitting device for connecting said motor with said intermediate transmission device at a different speed ratio from the first, the relative speed ratios of said transmitting devices being such as to give a progression in spindle speeds of a value approximate to a geometrical ratio, and means actuated by said controller for bringing said transmitting devices into action alternatively.

2. In speed-varying mechanism, the combination of an electromotor, a spindle to be driven thereby at selective speeds, a shaft intermediate the motor and the spindle, a plurality of gear-trains for transmitting motion from the motor to the shaft, a connection from said shaft to said spindle for impelling the latter at a determined relative ratio of speed, clutches in the gear-trains for rendering said trains alternatively active, a controller, and connections between the controller and the motor and the clutches.

3. In speed-varying mechanism, the combination of an electromotor, a spindle to be driven thereby at selective speeds, a shaft intermediate the motor and the spindle, a plurality of gear-trains for transmitting motion from the motor to the shaft, a connection from said shaft to said spindle for impelling the latter at a determined relative ratio of speed, another connection from said shaft to said spindle for impelling the latter at a lower relative speed ratio, means controlled by an electromagnet for rendering either of said connections effective, clutches in the gear-trains for rendering said trains alternatively active, a controller, and connections between the controller and the motor, clutches and the electromagnet.

4. In speed-varying mechanism, the combination, substantially as set forth, of a spindle, a driving device therefor, a train for transmitting motion from the driving device to the spindle, a clutch in said train, mechanism connected with the spindle for moving the clutch, an electromagnet, means for controlling the magnet, and connections between said mechanism and the armature of the magnet for throwing said mechanism into action.

5. In speed-varying mechanism, the combination, substantially as set forth, of a spindle, a driving device therefor, a train for transmitting motion from the driving device to the spindle, a clutch in said train, a rotary sliding member turning with the spindle and connected with said clutch and having an exterior thread, an electromagnet, means for controlling the magnet, a disengageable nut element for said thread, and a connection between said nut element and the armature of the magnet.

6. In speed-varying mechanism, the combination, substantially as set forth, of an electric motor, a spindle to be driven thereby at selective speeds, a plurality of pinions loose on the armature-shaft of the motor, diverse-ratio gear-trains connecting the pinions with the spindle, a magnetic clutch at each pinion for locking the pinions alternatively to the armature-shaft, and means for electrically controlling said motor and clutches.

7. In speed-varying mechanism, the combination, substantially as set forth, of a spindle, driving means therefor, a transmitting-train connecting the driving means with the spindle, a tooth-clutch interposed in said train, means for throwing the clutch while one of its members is in motion, and a spring interposed in the train at the clutch to receive the driving strain as the clutch is thrown.

8. In speed-varying mechanism, the combination, substantially as set forth, of a spindle, an electric motor for driving the same, a plurality of diverse-ratio gear-trains connecting the spindle with the motor, magnetic clutches in said trains, toothed clutches in said trains, power-transmitting springs in the trains at the toothed clutches, and means for controlling the clutches.

9. The combination of an electric motor, a gear loose on each end of the motor-armature shaft, means for connecting said gears with said shaft selectively, a counter-shaft, two gears thereon, each engaging one of the gears first mentioned, a spindle, a driven member driven from said counter-shaft, means for connecting said driven member directly with said spindle, and reduction-gearing intermediate said member and said spindle.

10. The combination of an electric motor, a gear loose on each end of the motor-armature shaft, means for connecting said gears with said shaft selectively, a counter-shaft, two gears thereon, each engaging one of the gears first mentioned, a spindle, a driven member driven from said counter-shaft, means for connecting said driven member directly with said spindle, reduction-gearing intermediate said member and said spindle, and magnetically-controlled means for connecting said driven member and said spindle through said reduction-gearing.

11. The combination of the motor, the plurality of primary gear ratios, the spindle, the direct-drive connection from the primary gearing to the spindle, and the magnetically-controlled reduction-gearing, substantially as described.

GUSTAF TURE RENNERFELT.

Witnesses:
MARY C. KIESEL,
CHARLES A. KIESEL.